(12) United States Patent
Dussart et al.

(10) Patent No.: US 11,273,904 B2
(45) Date of Patent: Mar. 15, 2022

(54) ACTUATOR ASSEMBLY FOR MOVING AN AIRCRAFT WING TIP DEVICE

(71) Applicant: AIRBUS OPERATIONS LIMITED, Bristol (GB)

(72) Inventors: Gaetan Dussart, Bristol (GB); Ciaran O'Rourke, Bristol (GB); Thomas Wilson, Bristol (GB); Mudassir Lone, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 132 days.

(21) Appl. No.: 16/728,692

(22) Filed: Dec. 27, 2019

(65) Prior Publication Data

US 2020/0207461 A1    Jul. 2, 2020

(30) Foreign Application Priority Data

Jan. 2, 2019 (GB) .................................... 1900044

(51) Int. Cl.
| | |
|---|---|
| *B64C 13/38* | (2006.01) |
| *B64C 3/42* | (2006.01) |
| *B64C 3/54* | (2006.01) |
| *B64C 3/56* | (2006.01) |
| *B64C 23/06* | (2006.01) |

(52) U.S. Cl.
CPC ................ *B64C 13/38* (2013.01); *B64C 3/42* (2013.01); *B64C 3/546* (2013.01); *B64C 3/56* (2013.01); *B64C 23/072* (2017.05)

(58) Field of Classification Search
CPC .......... B64C 13/38; B64C 3/42; B64C 3/546; B64C 3/56; B64C 23/072; B64C 2201/102

See application file for complete search history.

(56) References Cited

U.S. PATENT DOCUMENTS

| | | | |
|---|---|---|---|
| 2011/0180657 A1 | 7/2011 | Gionta et al. | |
| 2012/0228424 A1 | 9/2012 | Parker | |
| 2013/0099060 A1* | 4/2013 | Dees .......................... | B64C 3/56 244/199.4 |
| 2018/0001992 A1* | 1/2018 | Kracke ...................... | B64C 3/56 |
| 2019/0248468 A1* | 8/2019 | Lorenz ...................... | B64C 3/56 |

(Continued)

FOREIGN PATENT DOCUMENTS

| | | |
|---|---|---|
| EP | 3 495 258 | 6/2019 |
| GB | 562693 | 7/1944 |
| WO | 2017/118832 | 7/2017 |

OTHER PUBLICATIONS

Combined Search and Examination Report for GB1900044.7, dated Jun. 28, 2019, 6 pages.

*Primary Examiner* — Rodney A Bonnette
(74) *Attorney, Agent, or Firm* — Nixon & Vanderhye P.C.

(57) ABSTRACT

An actuator assembly for moving an aircraft wing tip device is disclosed. The wing tip device is rotatable about a hinge axis relative to a fixed wing of the aircraft. The hinge axis is orientated non-parallel to a line-of-flight direction of the aircraft. The actuator assembly includes a primary shaft having an axis of rotation orientated substantially parallel to the line-of-flight direction, a motor to cause rotation of the primary shaft, and a secondary shaft orientated substantially parallel to the hinge axis. The secondary shaft is couplable to the primary shaft and is arranged to rotate the wing tip device in response to the rotation of the primary shaft.

22 Claims, 7 Drawing Sheets

(56) References Cited

U.S. PATENT DOCUMENTS

2019/0359312 A1* 11/2019 Lorenz ..................... B64C 3/56
2020/0208687 A1*  7/2020 Dussart .................... B64C 3/56
2020/0398969 A1* 12/2020 Lorenz ..................... B64C 3/56

* cited by examiner ered substantially parallel to the hinge axis and couplable to the primary shaft. The secondary shaft is arranged to rotate the wing tip device about the hinge axis in response to the rotation of the primary shaft.

ACTUATOR ASSEMBLY FOR MOVING AN AIRCRAFT WING TIP DEVICE

CROSS RELATED APPLICATION

This application claims priority to United Kingdom (GB) Patent Application 1900044.7, filed Jan. 2, 2019, the entire contents of which is hereby incorporated by reference.

BACKGROUND OF THE INVENTION

The present disclosure relates to aircraft with moveable wing tip devices.

Aircraft may be equipped with moveable wing tip devices attached to fixed wings. The wing tip devices may be used to allow load-alleviation during flight, for example, in the event of wind gusts. Typically, large loads cause the wing tip device to move from a flight configuration in which the wing tip device is effectively a continuation of the fixed wing portion to a load-alleviating configuration in which the load on the wing is reduced. Once the cause of the requirement to enter the load-alleviating configuration has passed, it is often desirable to move the wing tip device back into the flight configuration. WO2017118832 discloses such a wing tip device, that is moveably mounted about a hinge.

Further, there is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage). Moveable wing tip devices may be used to enable the wing span to be reduced in a ground configuration.

An actuator, for example an electro-mechanical or hydraulic actuator, may be used to move the wing tip device between different configurations, for example between a flight configuration and a ground configuration when the aircraft is on the ground. However, such an actuator may require a substantial load and/or torque capacity, particularly where the actuator is to be used during flight. Typically, the larger the load and/or torque capacity required by the actuator, the larger and heavier the actuator. The inclusion of a large, heavy (and potentially complex) actuator system on the aircraft may lessen or erode some or all of the aerodynamic benefits brought about by the moveable wing tip device itself. Further, on-board space is an important consideration on aircraft. Some aircraft may not have enough space for a sufficiently powerful actuator capable of withstanding and/or generating torques as desired.

The present invention seeks to mitigate one or more of the above-mentioned problems. Alternatively or additionally, the present invention seeks to provide an improved aircraft and aircraft wing.

SUMMARY OF THE INVENTION

According to a first aspect, there is provided an aircraft comprising a wing. The wing has a fixed wing with a wing tip device. The wing tip device is rotatable, about a hinge axis, relative to the fixed wing. The hinge axis is orientated non-parallel to a line-of-flight direction of the aircraft. The aircraft comprises an actuator assembly operable to move the wing tip device relative to the fixed wing. The actuator assembly comprises a primary shaft having an axis of rotation orientated substantially parallel to the line-of-flight direction, a motor operable to cause rotation of the primary shaft, and a secondary shaft orientated substantially parallel to the hinge axis and couplable to the primary shaft. The secondary shaft is arranged to rotate the wing tip device about the hinge axis in response to the rotation of the primary shaft.

By orientating the primary shaft of the actuator assembly substantially parallel with the line-of-flight direction, an amount of aerodynamic drag caused by the actuator assembly may be reduced, compared to a case in which the primary shaft is not orientated substantially parallel with the line-of-flight direction (for example, where the primary shaft is orientated along or parallel with the hinge axis). The primary shaft may be considered as the "main shaft" of the actuator assembly as it may be driven by the motor at a predetermined angular speed. The primary shaft may be associated with other componentry, e.g. gearboxes, further motors and/or clutches, as will be described in more detail below. As such, a substantial part of the componentry, and in some cases a majority of the componentry, of the actuator assembly, may be aligned with the line-of-flight of the aircraft, despite the hinge axis of the wing tip device not being parallel with the line-of-flight direction. This results in an improved aerodynamic profile compared to a case in which the componentry of the actuator assembly is not aligned with the line-of-flight. The secondary shaft, which is orientated substantially parallel with the hinge axis (and thus non-parallel with the line-of-flight), may comprise a part of the hinge itself, or may comprise a separate shaft arranged along the hinge axis. As such, the secondary shaft may be coaxial with the hinge axis. In some cases, by providing primary and secondary shafts which are angled with respect to one another (the primary shaft being aligned with the line-of-flight and the secondary shaft being aligned with the hinge axis), the componentry of the actuator assembly may be divided between those two axes, thus saving space compared to a case in which all of the componentry is arranged along a single axis, e.g. the hinge axis. For example, one or more motors and/or one or more gearboxes may be provided with the primary shaft, and a clutch device may be provided with the secondary shaft.

As stated above, the hinge axis is orientated non-parallel to the line-of-flight direction. The hinge axis may be orientated such that the hinge axis at the trailing edge of the wing is further inboard than the hinge axis at the leading edge of the wing. The hinge axis may be orientated such that in a load alleviating configuration, the mean incidence of the wing tip device is reduced. The hinge axis may be orientated substantially perpendicular to the swept mean chord axis of the wing. The swept mean chord axis may be parallel to the longitudinal direction of the wing box. Such an arrangement has been found to be beneficial in terms of enabling a load reduction (in comparison with a hinge axis that is orientated parallel to the line-of-flight). Furthermore, such an orientation of hinge axis has been found to facilitate movement of the wing tip device to a stable load alleviating configuration. For example, when the hinge axis is in such an orientation, the wing tip device tends to move to a static-aeroelastically stable position even under purely aerodynamic loading. This orientation of hinge axis is therefore especially beneficial in combination with a restraining assembly in embodiments of the invention (as described below). The hinge axis may be orientated substantially perpendicular to the leading edge of the wing in some cases. The orientation of the hinge axis may be chosen such that it acts to stabilise flutter.

The primary shaft may be tubular. The motor may be at least partially enclosed by the primary shaft and configured to cause rotation of the primary shaft relative to the motor.

In some examples, the motor is housed entirely within the primary shaft. By providing a tubular shaft rotated by a motor that is at least partially housed within the tubular shaft, a compact assembly may be obtained. Such a compact assembly may be particularly beneficial where the actuator assembly is to be used in an environment having particular spatial considerations. For example, where the actuator assembly is to be positioned on an aircraft wing, it may be desirable to reduce the diameter (or height) of the actuator assembly to satisfy a desired aerodynamic profile, whereas the length of the actuator assembly may be less restricted, since the actuator assembly may be disposed along the wing in a streamwise direction. A tubular shaft with a motor contained therein provides a more compact and aerodynamic structure (particularly where the primary shaft is aligned with the line-of-flight direction) than a comparative case in which the primary shaft is not tubular. Moreover, there may be a trade-off between reducing the diameter of the primary shaft (to optimise the aerodynamic profile) and maintaining the capacity to withstand torque acting on the wing tip device and transferred to the primary shaft. The diameter of the primary shaft may be determined by the maximum aerodynamic hinge loads the actuator assembly is required to withstand. A primary shaft with a larger diameter may be able to withstand a greater amount of torque acting upon the wing tip device than a shaft with a smaller diameter. As such, by providing a tubular shaft that encompasses (at least partially) the motor driving the actuator assembly, the primary shaft is compact and space-saving whilst also being able to withstand torque to a sufficient degree.

Moreover, the tubular architecture can be used for different wings and/or wing tip devices without significant redesign. Based on the desired load capacity of the actuator assembly (determined from the wing and/or wing tip device geometry and/or other aircraft characteristics), the diameter of the tubular shaft can be adjusted, and differently sized motor(s) may be used such that they fit within the adjusted tubular shaft. Thus redesign and/or modification of the actuator assembly to fit different aircraft may be simplified compared to a case in which the actuator assembly has a different configuration.

Further, the tubular arrangement of the actuator assembly (with the motor housed inside the tubular shaft) enables manufacturing, retro-fitting and/or maintenance processes to be simplified. The primary shaft with the motor housed therein may be removed and/or mounted as a single component or device. In the case of failure, the tubular structure can be removed for maintenance and a replacement tubular structure (with replacement motor housed therein) installed, i.e. in a simple "plug-out/plug-in" manner. Thus the aircraft may remain operational for longer (i.e. by reducing downtime for aircraft maintenance).

The primary shaft may comprise an opening. The actuator assembly may comprise fixing means extending between the motor and the wing, through the opening of the primary shaft, to fix the motor to the wing. As such, the primary shaft may rotate relative to the motor, which is kept fixed to the wing. The opening may allow for lugs or other fixing means to pass therethrough (for example to connect the motor to the aircraft wing, when the motor is housed within the primary shaft). The fixing means enables the motor and/or other componentry within the primary shaft to maintain a correct position and/or alignment. Further, the fixing means facilitates the transmission of shear forces and the distribution of loads along the chord of the wing. The opening may also allow for electrical wiring, pipes and/or other connections between the motor and the aircraft. The opening may also enable facilitate thermal management, e.g. via cooling fluids transmitted through pipes which pass through the opening to the motor.

The opening may comprise a slot extending around a part of the circumference of the primary shaft in an azimuthal direction. The fixing means may extend through such a slot, such that the motor remains fixed to the wing via the fixing means during the rotation of the primary shaft. The primary shaft may be arranged to rotate by less than 360 degrees. The rotation range of the primary shaft may be determined by the maximum and/or minimum folding capability of the wing tip device. The primary shaft and the wing tip device may have a 1:1 rotational ratio in some examples. For example, in order to rotate the wing tip device by 90 degrees, the primary shaft may also be rotated by 90 degrees; in order to rotate the wing tip device by 120 degrees, the primary shaft may be rotated by 120 degrees, etc. The azimuthal slot allows the primary shaft to rotate without affecting the fixing means passing therethrough. The motor can thus be kept in the correct position and alignment, despite the rotation of the primary shaft. The primary shaft and the wing tip device may have different rotational ratios in other examples. In some cases, the primary shaft is arranged to rotate by at least 360 degrees, for example if the resulting separated elements jointly drive an offset parallel additional shaft (through external radial gearing for instance).

The motor may comprise an axial flux motor (AFM). An axial flux motor may provide a higher power and/or torque density compared to some other types of motor. The axial flux motor may comprise a dual stator configuration to provide an increased power density. Further, using an axial flux motor may be more spatially efficient (i.e. satisfying the spatial requirements of the actuator assembly) compared to using some other types of motor. The actuator assembly may comprise a plurality of motors arranged to complementarily cause rotation of the primary shaft. For example, the actuator assembly may comprise a stack or sequence of axial flux motors, arranged coaxially and housed within the primary shaft. Each of the motors may contribute towards the rotation of the primary shaft relative to the motors. Using a plurality of motors enables a greater amount of torque to be imparted onto the primary shaft compared to a case in which a single motor is used.

The actuator assembly may comprise an input shaft co-aligned with the primary shaft, and a gearbox coupling the input shaft with the primary shaft. The motor may be operable to drive the input shaft thereby to cause rotation of the primary shaft. The gearbox may be a high density reduction gearbox. The gearbox may comprise a planetary gearbox, also referred to as an epicyclic gearbox. Using such a gearbox may reduce a torque requirement on the motor, thereby enabling a smaller motor to be used compared to a case in which such a high density gearbox is not used. For example, the motor may drive the input shaft at a relatively fast angular speed, and for a relatively large number of rotations, in order to cause the primary shaft to rotate for a single rotation (or less than one full rotation). The gearbox/motor combination is able to provide a high-torque low-speed power transmission to controllably rotate the wing tip device. Where the primary shaft is tubular, the gearbox may be at least partially enclosed by the primary shaft. The primary shaft may be configured to rotate relative to the gearbox. As such, a compact, space-saving and aerodynamic arrangement may be provided, compared to a case in which the gearbox is not housed within the primary shaft. The gearbox may be fixed to the wing via fixing means passing through an opening in the primary shaft, in a similar manner to that described for the motor. In some cases, a plurality of gearboxes are used, for example a stack of coaxially-arranged gearboxes. Using a plurality of gearboxes further increases the power capabilities of the actuator assembly and reduces the torque requirements of the motor(s). Stacking the gearboxes coaxially provides a high density, high torque actuator assembly whilst satisfying potentially strict spatial requirements.

The actuator assembly may comprise a clutch for selectively disengaging the wing tip device from the motor. As such, the motor may be protected from torque acting upon or caused by the wing tip device. For example, when the wing tip device is allowed to passively (i.e. under aerodynamic forces) move from a flight configuration to a load alleviating configuration, the moving wing tip device may impart a torque on the actuator assembly. Selectively disengaging the wing tip device from the motor may prevent the motor from being back-driven, and may thus reduce the likelihood of damage or wear to the motor. In cases where the actuator assembly comprises a gearbox, the clutch may also prevent the gearbox from being back-driven, and may similarly protect the gearbox from torque acting upon or caused by the wing tip device. The clutch may be arranged to selectively decouple the secondary shaft from the primary shaft. As such, the secondary shaft may be reversibly and repeatably couplable with the primary axis. The clutch may be arranged on the secondary shaft. As such, the clutch may be arranged as close to the wing tip device, and as far from the motor, as possible, in order to reduce the likelihood of the motor being back-driven due to torque acting on or caused by the wing tip device. Further, arranging the clutch on the secondary shaft may save space on the primary shaft, which space may instead be used, if available, for driving means such as motors, gearboxes, etc. In other cases, the clutch may be arranged on the primary shaft, or between the primary shaft and the secondary shaft.

The actuator assembly may comprise a bevel gear for coupling the primary shaft and the secondary shaft. The bevel gear may be arranged at an end of the primary shaft that is closest to the wing trailing edge, for example. The bevel gear allows the primary shaft to drive the secondary shaft, despite the primary shaft and the secondary shaft being non-parallel to one another. That is, the bevel gear allows the primary shaft to be aligned with the line-of-flight direction whilst the secondary shaft is aligned with the hinge axis (and may indeed form the hinge itself).

The aircraft may comprise an aerodynamic fairing arranged to enclose at least part of the actuator assembly. For example, the aerodynamic fairing may be arranged to at least partially enclose the primary shaft and/or the secondary shaft. Where the primary shaft and the secondary shaft are coupled via a bevel gear, the aerodynamic fairing may be arranged to enclose the bevel gear. Using such a fairing has been found to be beneficial for reducing drag caused by the presence of the actuator assembly on the wing, compared to a case in which a fairing is not used. The fairing may be aligned with the primary shaft, namely along the line-of-flight direction. Such an alignment, and the compact structure formed by the fairing and the primary shaft, is particularly beneficial for drag reduction purposes.

The wing tip device may be rotatable, about the hinge axis, between i) a flight configuration for use during flight, and ii) a load alleviating configuration for load alleviation during flight. In the flight configuration, upper and lower surfaces of the wing tip device may be continuations of upper and lower surfaces of the fixed wing. In the flight configuration, the trailing edge of the wing tip device may be a continuation of the trailing edge of the fixed wing. The leading edge of the wing tip device may similarly be a continuation of the leading edge of the fixed wing. There may be a smooth transition from the fixed wing to the wing tip device. It will be appreciated that there may be a smooth transition, even where there are changes in sweep or twist at the junction between the fixed wing and wing tip device. However, there are preferably no discontinuities, unless designed specifically for other purposes, at the junction between the inner wing and wing tip device in the flight configuration. In the load alleviating configuration, the wing tip device is moved relative to the fixed wing, and the load on the wing is reduced. In some cases, at least one of the upper and lower surfaces of the wing tip device are moved away from the respective surface of the fixed wing in the load alleviating configuration.

In the load alleviating configuration, the load on the wing tip may be reduced, and in some embodiments it may be substantially eliminated. Such an arrangement has been found to be especially beneficial when the aircraft is undergoing roll. In particular, since the lift forces at the tips of the wings are alleviated, they tend not to act against (i.e. they tend not to damp) the rolling motion. This may enable the aircraft to be more responsive when undergoing roll (or as responsive as an aircraft with a correspondingly shorter wing span).

When the wing tip device is in the load alleviating configuration, the aircraft incorporating the wing is still suitable for flight, but the wing tip device is preferably moved to a position in which the load on the wing is alleviated. It will be appreciated that the load alleviating configuration may encompass the wing tip device being in a range of positions (all of which alleviate load to some degree). The position (for example the magnitude of rotation about the hinge axis) may be dependent on the magnitude of load that is sought to be alleviated. In the load alleviating configuration the wing tip device remains attached to the fixed wing. The wing tip device may be repeatably moveable between the load alleviating configuration and the flight configuration.

Load alleviation has been found to be especially beneficial during low-speed operations (for example during take-off, climb and/or landing). Due to system complexity, it tends to be difficult to integrate high-lift devices (such as slats) into a moveable wing tip device. The wing tip may therefore be prone to stall during low speed operations such as those indicated above. By moving the wing tip device to the load alleviating configuration, the onset of stall may be alleviated (thereby avoiding the associated drag rise). This may assist the aircraft in meeting low speed requirements, especially for take-off and climb.

The aircraft may comprise a restraining assembly operable between a restraining mode in which the wing tip device is held in the flight configuration using a restraining force, and a releasing mode in which the restraining force on the wing tip device is released, such that the wing tip device is able to adopt the load alleviating configuration.

Providing a restraining assembly that is operable into a releasing mode in which the restraining force is released, has been found to be especially beneficial. For example, the wing tip device can be securely held in the flight configuration during normal cruise flight, but if the aircraft encounters gusts, or other high load events, the restraining force can be released such that the wing tip device is movable quickly to the load alleviating configuration. This may mean the wing can avoid being subjected to high gust loadings. This in turn may enable the wing to have a relatively large span, without necessarily having to incur the associated weight penalty, because it can be designed for a lower magnitude of maximum load.

The wing may comprise a biasing member, arranged such that when the wing tip device is in the flight configuration, the biasing member exerts a biasing force to urge the wing tip device towards the load alleviating configuration. Such an arrangement has been found to be beneficial because it tends to reduce the lag between the restraining assembly adopting the releasing mode, and the wing tip device actually moving to the load alleviating configuration (the biasing force assisting the movement of the wing tip device into the load alleviating configuration such that it is moved under the action of both the biasing force and aerodynamic forces. Having the restraining assembly in combination with this hinged wing tip device may be referred to as a "semi-aeroelastic" arrangement). Further, having the biasing member may be beneficial in reducing flutter (for example reducing the speed at which flutter may occur).

When the restraining assembly is in the restraining mode (e.g. when a clutch is engaged), the biasing force may be overcome by the restraining force. But, when the restraining assembly is in the releasing mode, the biasing force may be sufficient to assist in moving the wing tip device into the load alleviating configuration. In some embodiments, when the restraining assembly is in the releasing mode, the biasing force may be sufficient to move the wing tip device into the load alleviating configuration. Such an arrangement provides reassurance that the wing tip device can move to the load alleviating configuration, if needs be, even in the absence of aerodynamic forces acting on the wing tip device. Nevertheless, the wing tip device may be arranged such that it may be moved from the flight configuration to the load alleviated configuration, at least partially by aerodynamic forces acting on the wing tip device. In some embodiments, the aircraft does not comprise a biasing member. In such embodiments, the wing tip device may be free to rotate when the restraining assembly is in the releasing mode (i.e. there may be substantially no other resistive forces acting to prevent rotation once the restraining force is removed).

In the restraining mode the wing tip device is held in the flight configuration using a restraining force. In the releasing mode it is that restraining force (which had been exerted to hold the device in the flight configuration) which is released. It will be appreciated that when the restraining assembly is in the releasing mode, this does not necessarily preclude there still being resistive forces per se present between the wing and wing tip device (for example from a damper).

The actuator assembly may be operable to move the wing tip device from the load alleviating configuration to the flight configuration. As such, the actuator assembly may be used to "recapture" the wing tip device after the wing tip device has been released into the load alleviating configuration. In some embodiments, the actuator assembly is operable to move the wing tip device from the flight configuration to the load alleviating configuration. For example, the actuator assembly may assist in or contribute to moving the wing tip device into the load alleviating configuration. As such, the wing tip device may be moved into the load alleviating configuration through one or more of: aerodynamic forces, the biasing force, and actuator-driven rotation.

Embodiments of the invention are especially beneficial in arrangements in which the wing tip device is arranged to be moveable for both load alleviation, and for enabling a relatively large span in flight, yet a reduced span on the ground to comply with airport gate limits. Thus, in some embodiments of the invention, the wing tip device is also operable in a ground configuration for use during ground-based operations. In the ground configuration, the wing tip device is moved away from the flight configuration such that the span of the wing is reduced. In the flight configuration, the span may exceed an airport compatibility gate limit. In the ground configuration the span is reduced such that the span (with the wing tip device in the ground configuration) is less than, or substantially equal to, the airport compatibility gate limit.

The wing tip device may be operable in all of the flight configuration, load alleviating configuration and ground configuration. In some cases, the wing tip device is operable in only the flight configuration and the ground configuration. The actuator assembly may be operable to move the wing tip device between the ground configuration and the flight configuration. For example, the actuator assembly may be operable to move the wing tip device from the ground configuration to the flight configuration, and/or move the wing tip device from the flight configuration to the ground configuration. The actuator assembly may be operable to move the wing tip device when the aircraft is on the ground, in flight, or both. In the ground configuration, the wing tip device may be rotated about the hinge axis by an angle greater than the maximum angle about which it may be rotated in the load alleviating configuration. In the ground configuration the wing tip device remains attached to the wing.

The wing tip device may be rotatable, from the flight configuration to the load alleviating configuration, in an upwards direction. The wing tip device may be rotatable, from the flight configuration to the load alleviating configuration, in a downwards direction. The hinge may be a double hinge enabling both upwards or downward rotation. Providing such a double hinge has been found to be beneficial because it may enable loads from both upwards and downwards events (such as gusts) to be alleviated.

The wing tip device may be a wing tip extension; for example the wing tip device may be a planar tip extension. In other embodiments, the wing tip device may comprise, or consist of, a non-planar device, such as a winglet.

According to a second aspect, there is provided an aircraft wing for use on an aircraft according to the first aspect. The wing comprises a fixed wing with a wing tip device, the wing tip device being rotatable, about a hinge axis, relative to the fixed wing. The hinge axis is orientated non-parallel to a line-of-flight direction. The wing comprises an actuator assembly operable to move the wing tip device relative to the fixed wing. The actuator assembly comprises a primary shaft having an axis of rotation orientated substantially parallel to the line-of-flight direction, a motor operable to cause rotation of the primary shaft, and a secondary shaft orientated substantially parallel to the hinge axis and couplable to the primary shaft. The secondary shaft is arranged to rotate the wing tip device about the hinge axis in response to the rotation of the primary shaft.

According to a third aspect, there is provided an actuator assembly for use as the actuator assembly in either of the first or second aspects. The actuator assembly is arranged to be installed on an aircraft wing and to move a wing tip device relative to a fixed wing. The actuator assembly comprises a primary shaft, a motor operable to cause rotation of the primary shaft, and a secondary shaft orientated non-parallel to the primary shaft and couplable to the primary shaft. The actuator assembly may comprise more than one motor. The secondary shaft is arranged to rotate the wing tip device, about a hinge axis, relative to the fixed wing, in response to the rotation of the primary shaft.

According to a fourth aspect, there is provided a method. The method comprises providing a wing for an aircraft. The wing comprises a fixed wing, and a wing tip device mounted on a hinge. The hinge has a hinge axis. The wing tip device is rotatable about the hinge axis relative to the fixed wing. The method further comprises mounting an actuator assembly on the wing. The actuator assembly is operable to rotate the wing tip device about the hinge axis. The actuator assembly comprises a tubular shaft, and a motor, at least partially housed within the tubular shaft and operable to cause rotation of the tubular shaft relative to the motor. The tubular shaft is orientated non-parallel to the hinge axis.

By mounting the actuator assembly on the wing, an existing aircraft and/or aircraft wing may be retro-fitted with the actuator assembly. Retro-fitting the actuator assembly onto an existing wing may be less costly, use less material and/or be less time-consuming than constructing a new wing incorporating the actuator assembly.

According to a fifth aspect, there is provided an aircraft comprising a wing. The wing has a fixed wing with a wing tip device. The wing tip device is rotatably mounted about a hinge axis, such that the wing tip device may rotate, about the hinge axis, relative to the fixed wing. The aircraft comprises an actuator assembly operable to rotate the wing tip device about the hinge axis. The actuator assembly comprises a tubular shaft having an axis of rotation orientated non-parallel to the hinge axis. The actuator assembly further comprises a motor, at least partially housed within the tubular shaft and operable to cause rotation of the tubular shaft. The actuator assembly also comprises a tip-rotating shaft arranged along the hinge axis and coupled to the tubular shaft, thereby to rotate the wing tip device about the hinge axis in response to the rotation of the tubular shaft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
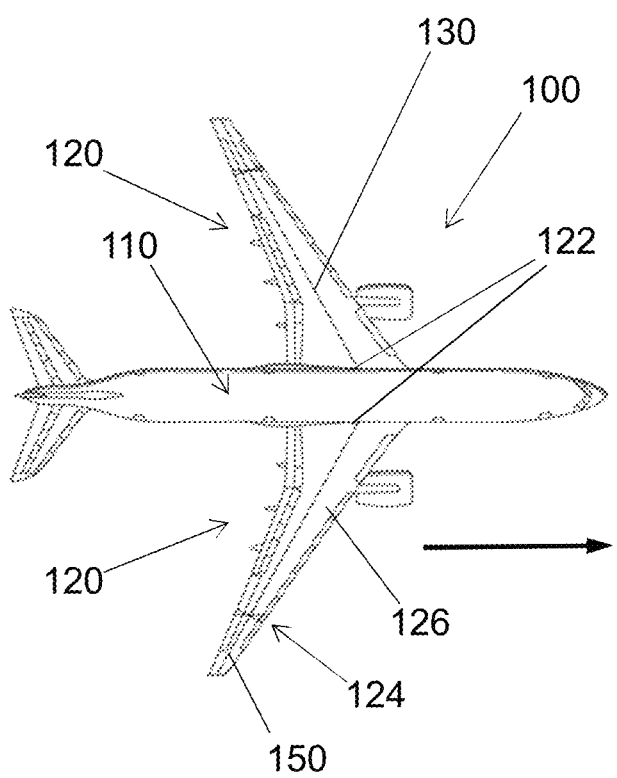
FIG. 1A shows a schematic plan view of an aircraft according to a first embodiment.

FIG. 1A is a plan view of an aircraft 100 according to a first embodiment. The aircraft 100 comprises a central fuselage 110 and two main wings 120 extending outwardly from respective wing roots 122.

Figure 1B:
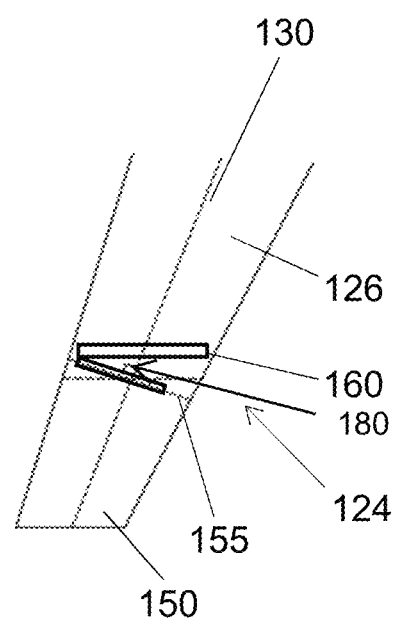
FIG. 1B shows a schematic plan view of part of a wing of the aircraft of FIG. 1A.

Each wing 120 comprises a fixed wing 126 extending from the root 122 to the tip 124 (shown in close up in FIG. 1B). At the tip 124 of the fixed wing 126, the wing 120 also comprises a moveable wing tip device 150. In this embodiment, the wing tip device 150 comprises a planar wing tip extension. The wing tip device 150 is rotatably mounted on a hinge, having a hinge axis 155 (depicted with a dashed line in FIGS. 1A and 1B). As such, the wing tip device 150 is able to rotate about the hinge axis 155 relative to the fixed wing 126.

In this embodiment, the hinge axis 155 is orientated non-parallel to a line-of-flight direction of the aircraft 100 (the line-of-flight direction being shown with a dashed line in FIG. 1B for comparison). More specifically, in this embodiment, the hinge axis 155 is orientated perpendicular to the swept mid-chord axis 130. The hinge axis 155 may have other orientations in other embodiments.

The aircraft 100 also comprises an actuator assembly 160, as will be described in more detail below. The actuator assembly 160 is operable to rotate the wing tip device 150 about the hinge axis 155.

Figure 1C:
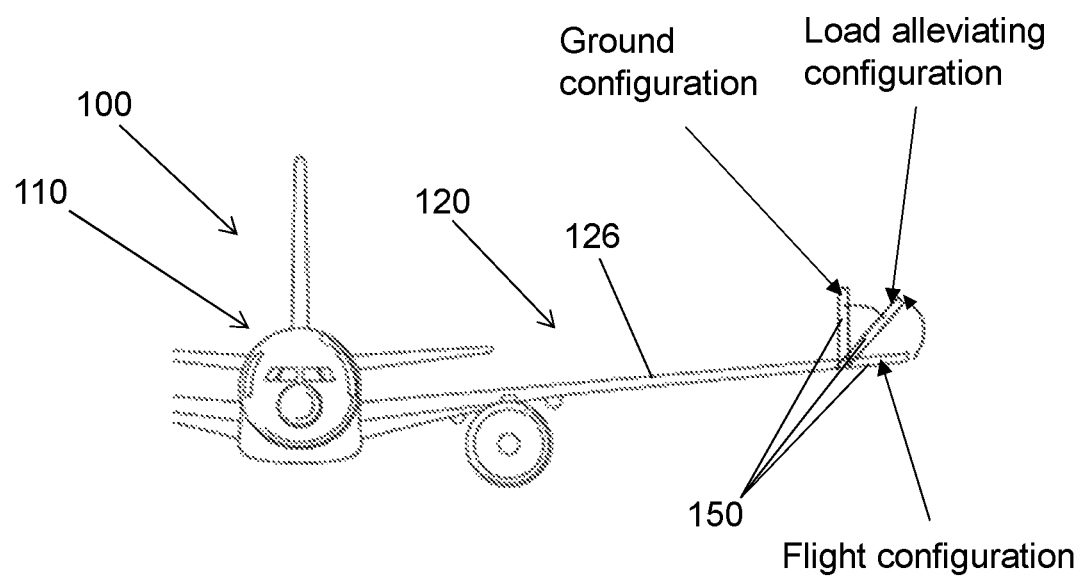
FIG. 1C shows a schematic front view of the aircraft of FIGS. 1A and 1B.

Referring to FIG. 1C, the wing tip device 150 is rotatable about the hinge axis 155 between a flight configuration, a load-alleviating configuration, and a ground configuration.

In the flight configuration, the wing tip device 150 is an extension of the fixed wing 126. Accordingly, the upper and lower surfaces of the fixed wing 126 are continuous with the upper and lower surfaces of the wing tip device 150 in this embodiment. The leading and trailing edges of the fixed wing 126 are also continuous with the respective leading and trailing edges of the wing tip device 150 (see FIGS. 1A and 1B). Such an arrangement is beneficial as it provides a relatively large wing span, thereby providing an aerodynamically efficient aircraft. However, a large span can result in correspondingly large loads on the wing 120, particularly a large wing root bending moment, especially during high load events such as gusts or extreme manoeuvres. The wing 120 may be sized to cope with these maximum loads, which can result in a relatively heavy wing. The ability of the wing tip device 150 to move to the load-alleviating configuration seeks to address that problem.

The wing tip device 150 is rotatable, upwards, from the flight configuration to the load alleviating configuration. The wing tip device 150 may be rotatable such that the lower surfaces between the fixed wing 126 and the wing tip device 150 are no longer continuous with one another. Since the hinge axis 155 is angled with respect to the airstream-wise direction, when the wing tip device 150 rotates upwards its mean incidence is reduced. In this configuration the lift generated by the wing 120 is significantly reduced and the load on the wing tip device 150 is also significantly reduced. The wing tip device 150 is moveable to this configuration during flight.

The wing tip device 150 is also configurable in a ground configuration in which the wing tip device 150 is rotated yet further, to a substantially upright position (shown in FIG. 1C). The wing tip device 150 is moveable to this configuration when the aircraft 100 is on the ground. Once rotated to such a position, the span of the aircraft 100 is sufficient to meet airport compatibility gate limits. Thus, the aircraft 100 of the first embodiment can have a large span (exceeding gate limits) during flight, but is still able to comply with gate limits when on the ground.

In this embodiment, the aircraft 100 is provided with a restraining assembly 180. The restraining assembly is described in detail in WO2017118832. The restraining assembly comprises a shaft (that forms the shaft of the hinge), a brake and a rotational spring. The brake comprises pads configured to selectively clamp against the shaft to restrain its motion. The restraining assembly is operable between a restraining mode (in which the brake is deployed to brake the rotation of the shaft), and a releasing mode (in which the brake is released by pulling the pads away from the shaft to allow its free rotation (and thus rotation of the wing tip device)). The default (passive) mode of the restraining assembly is the restraining mode in which the shaft is braked. When the wing tip device is in the flight configuration, the power to the restraining assembly is switched OFF (i.e. the restraining assembly is passive) and the restraining assembly is left with the shaft braked. A control module (not shown) may switch the restraining assembly ON, e.g. when an oncoming gust is detected, which releases the brake. Such an arrangement enables the wing tip device to be securely held in the flight configuration during normal cruise flight, but by switching the releasing assembly ON to release the brake, the wing tip device is movable quickly to the load alleviating configuration. This means the wing can avoid being subjected to high gust loadings. This in turn may enable the wing to have a relatively large span, without necessarily having to incur the associated weight penalty, because it can be designed for a lower magnitude of maximum load.

The wing tip device may, at least partially, be moveable to the load alleviating configuration purely under the action of aerodynamic force acting on it during flight, or under the gust loads. However, in this embodiment, the restraining assembly comprises a rotational spring (not shown). The rotational spring is located at one end of the hinge. The rotational spring is preloaded such that when the wing tip device is in the flight configuration, it exerts a biasing force that urges the wing tip device towards the load alleviating configuration. That biasing force is unable to overcome the restraining force exerted by the brake when it is deployed. However, when the brake (or, in some cases, a clutch of the actuator assembly 160) is released, the biasing force (in addition to aerodynamic forces acting on the wing tip device) acts to rotate the wing tip device about the hinge. The pre-loaded spring is an example of a biasing member. Providing a pre-loaded spring in this manner has been found to be beneficial as it quickly moves the wing tip device to the load alleviated configuration, as soon as the brake has been released.

It will be appreciated that wing tip devices may be moveable in a different manner (e.g. without the use of a restraining assembly and/or biasing member) in other embodiments.

Figure 2A:
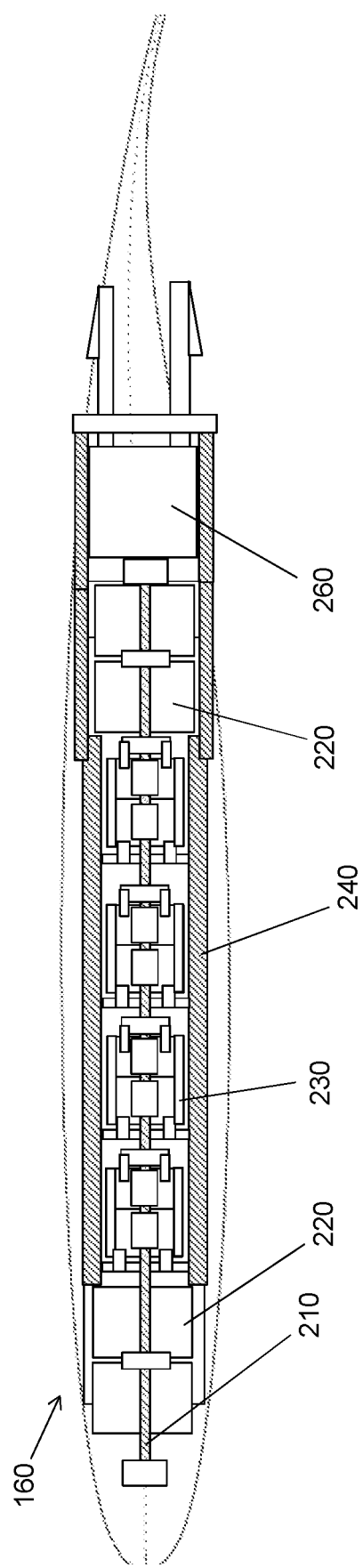
FIG. 2A shows a schematic sectional view of part of an actuator assembly according to the first embodiment, taken along a vertical plane containing the axis of the primary shaft of the actuator assembly.
Figure 2B:
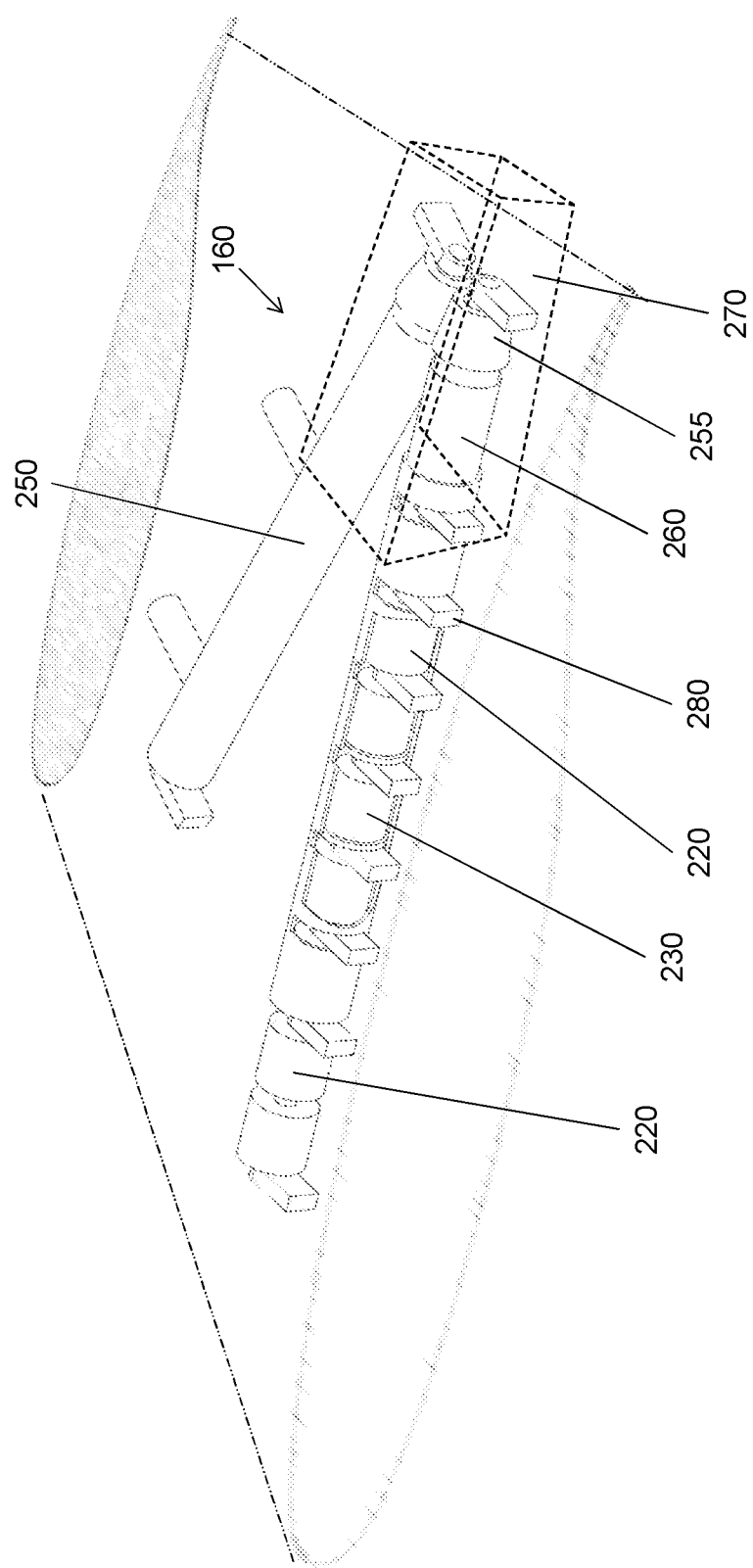
FIG. 2B shows a schematic perspective view of the actuator assembly of FIG. 2A.

FIGS. 2A and 2B show the actuator assembly 160 according to the first embodiment. FIG. 2A is a sectional view of a part of the actuator assembly 160, and FIG. 2B is a diagonal perspective view of the actuator assembly 160.

The actuator assembly 160 comprises an input shaft 210. The input shaft 210 is to be arranged in a streamwise direction on the aircraft wing. The input shaft 210 is driven by a plurality of AFMs 220. As such, the input shaft 210 is a common drive shaft for the plurality of AFMs 220. A plurality of gearboxes 230 converts rotation of the input shaft 210 into rotation of an output shaft 240. The gearboxes 230 are high density reduction gearboxes. The gearboxes 230 may have substantially high gear ratios. For example, the gearboxes 230 may have gear ratios of more than 1000. In some cases, the gearboxes 230 have gear ratios of more than 2000. The output shaft 240 is referred to as the "primary shaft" in examples disclosed herein. The output shaft 240 is coaxial with the input shaft 210. As such, the output shaft 240 is to be arranged substantially parallel with the line-of-flight direction of the aircraft, and thus out of alignment with the hinge axis. The output shaft 240 is tubular in this embodiment. In other words, the output shaft 240 is hollow. As such, the output shaft 240 is arranged to house, at least partially, the input shaft 210, one or more of the AFMs 220 and/or one or more of the gearboxes 230. That is, the output shaft 240 comprises a tubular housing. This results in a more compact, space-saving arrangement, compared to a case in which the output shaft 240 is not hollow.

The output shaft 240 is coupled to a tip-rotating shaft 250 via bevel gears 255. The tip-rotating shaft 250 is referred to as the "secondary shaft" in examples disclosed herein. The tip-rotating shaft 250 is orientated substantially parallel with the hinge axis (e.g. within acceptable manufacturing tolerances). The tip-rotating shaft 250 may form part of the hinge about which the wing tip device is configured to rotate. The tip-rotating shaft 250 is configured to rotate the wing tip device in response to rotation of the output shaft 240. In other words, the AFMs 220 drive the input shaft 210, which in turn rotates the output shaft 240 via the gearboxes 230, and the rotation of the output shaft 240 causes, via the bevel gears 255, rotation of the tip-rotating shaft 250. As such, all of the components of the actuator assembly 160, apart from the tip-rotating shaft 250 itself and its associated bevel gear, are arranged in a compact, tubular configuration, or cylindrical stacking, which is substantially aligned with the line-of-flight of the aircraft (e.g. within acceptable manufacturing tolerances), thus enabling an aerodynamic penalty associated with the presence of the actuator assembly to be reduced.

The actuator assembly 160 comprises a clutch 260. In this embodiment, the clutch 260 is coaxial with the output shaft 240. The clutch 260 is arranged between the AFMs 220 and the wing tip device (not shown), and is configured to selectively disengage the wing tip device from the AFMs 220 and/or from the gearboxes 230. The clutch 260 may reduce a likelihood of back-driving of the AFMs 220 and/or the gearboxes 230, thereby reducing a likelihood of damage to those components. If engagement of the wing tip device with the AFMs 220 and/or the gearboxes 230 is maintained when the wing tip device is released from the flight configuration to the load alleviating configuration (e.g. when the restraining assembly is released, causing a relatively quick movement of the wing tip device out of the flight configuration), a substantial amount of torque may be transmitted from the wing tip device to the actuator assembly 160. Therefore, in order to protect the AFMs 220 and/or the gearboxes 230 from mechanical stress and/or back-driving, the clutch 260 enables those components to be quickly disengaged from the wing tip device (e.g. prior to releasing the restraining assembly).

In this embodiment, the clutch 260 comprises a dog clutch. Using a dog clutch may be beneficial over other types of clutch due to the relatively slow rotation speeds (typically 0.25 to 1 rpm) of the output shaft 240 when the actuator assembly 160 is used to move the wing tip device, and the relatively steady position of the wing tip device when the wing tip device is moved towards the flight configuration. Further, smaller actuation devices can be used to engage the dog clutch than is the case for some friction clutches. The dog clutch may be spring-mounted for release, e.g. in case of failure of the AFMs 220, and for overall faster release of the wing tip device. The dog clutch spline/tooth angle may be designed for release under high torque. For example, smooth and/or non-rectangular tooth shapes may be used. One or more sensors may be used to align the teeth of the dog clutch prior to re-engagement. A stabilisation device (not shown) may be provided to maintain correct alignment of the actuator assembly 160 upon release of the clutch 260. Other types of clutch may be used in other embodiments. For example, a friction clutch may be used in some examples. The clutch 260 may be engaged and disengaged using a sliding actuation means, e.g. including rails, in order to maintain correct alignment.

In this embodiment, the bevel gears 255 are housed in a fairing 270. The fairing 270 is arranged at the trailing edge of the wing. The fairing 270 is orientated substantially parallel with the line-of-flight direction. The fairing 270 may be similar to a flap track fairing. In some embodiments, a fairing is provided at the leading edge of the wing. Such a fairing may at least partially enclose the outer shaft 240, for example. In some cases, the actuator arrangement 160 is provided without any corresponding fairings.

The actuator assembly 160 comprises fixing means 280 arranged to fix the AFMs 220 and the gearboxes 230 to the aircraft wing. The fixing means 280 may comprise lugs for attaching the componentry of the actuator assembly 160 to the wing. The lugs form rigid links to the wing, which can serve as aerodynamic load distribution paths. That is, the fixing means 280 may be used to distribute loads along the chord of the wing. Further, the fixing means 280 may be able to transmit shear force from the actuator assembly 160 onto the wing. The fixing means 280 may be used to maintain correct alignment of the input shaft 210 to the wing. The fixing means 280 connect the wing with the componentry housed inside the output shaft 240 via slots in the output shaft 240. Such slots are circumferential, such that the fixing means 280 are not affected by the rotation of the output shaft 240 about its rotational axis. The length of the slots around the circumference of the output shaft 240 may determine the rotational range of the output shaft 240, and thus the folding capability of the wing tip device. The thickness and/or diameter of the slots may be adjusted to ensure that the output shaft 240 remains structurally sound, e.g. when substantial torques are applied. In addition to allowing the fixing means 280 to connect the AFMs 220 and/or gearboxes 230 to the wing, the slots in the output shaft 240 may be useable to perform maintenance on the componentry housed within the output shaft 240, without having to remove or disassemble the output shaft 240 itself, thereby simplifying maintenance procedures. The slots may also be used for thermal management, e.g. by feeding cooling fluids through the slots. In this embodiment, the fixing means 280 extend radially away from the input shaft 210 in a horizontal direction. The fixing means may extend away from the input shaft 210 in a vertical direction in other embodiments.

Figure 3:
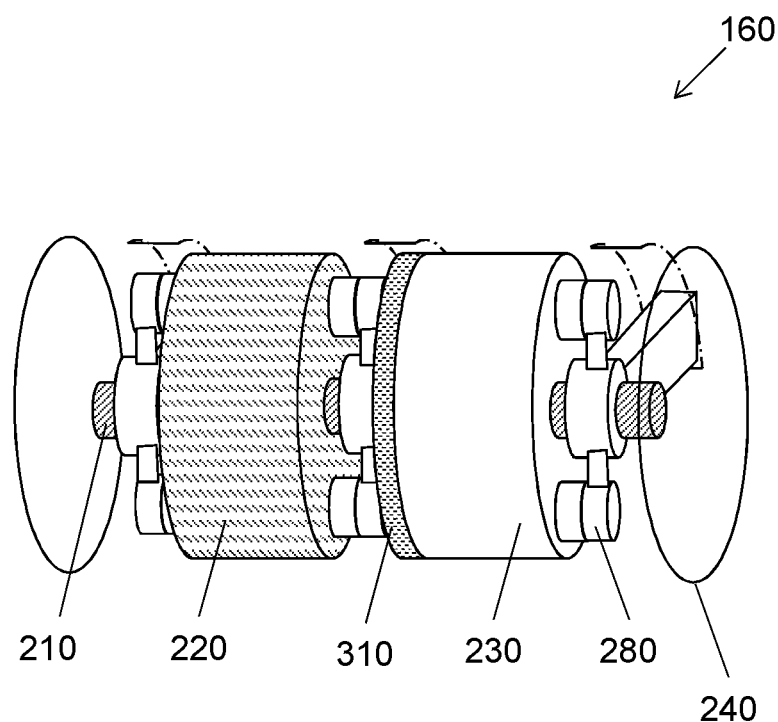
FIG. 3 shows a close-up view of part of the actuator assembly of FIGS. 2A and 2B.

FIG. 3 is a close-up view of a part of the actuator assembly 160.

As shown in FIG. 3, an AFM 220 and a gearbox 230 are arranged coaxially within the output shaft 240. The AFM 220 drives the input shaft 210, and the gearbox 230 couples the input shaft 210 with the output shaft 240 (via the output disc 310 of the gearbox 230), to cause rotation of the output shaft 240 relative to the AFM 220 and the gearbox 230. The AFM 220 and the gearbox 230 are kept fixed relative to the wing, via fixing means 280. The fixing means 280 rigidly couples the AFM 220 and the gearbox 230 with the wing, and also maintains alignment of the input shaft 210.

Figure 4:
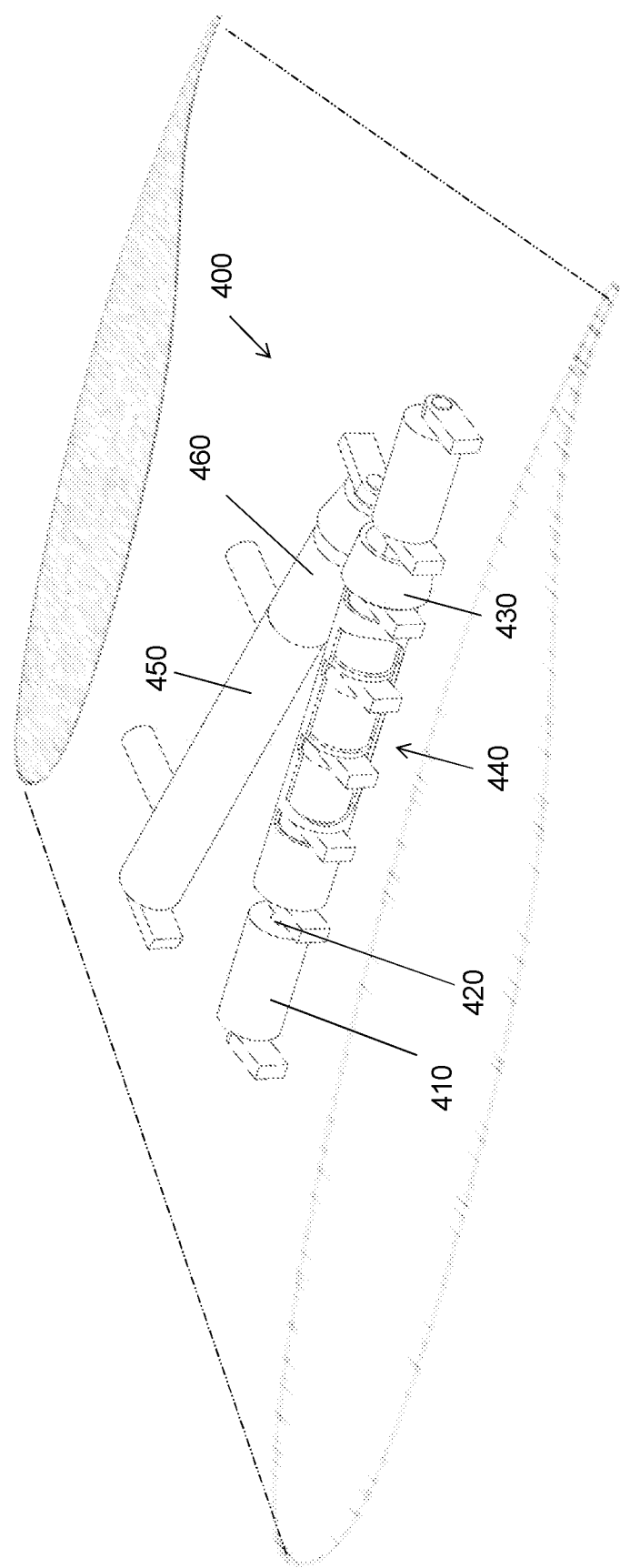
FIG. 4 shows a schematic perspective view of an actuator assembly according to a second embodiment.

FIG. 4 is a diagonal perspective view of an actuator assembly 400 according to a second embodiment.

In the second embodiment, radial flux motors (RFMs) 410 are provided instead of AFMs. An RFM may have a greater length (along the axis of the input shaft) than a corresponding AFM having the same torque capability. However, an RFM may have a smaller diameter than a corresponding ADM having the same torque capability. Therefore, depending on the spatial and aerodynamic requirements of the aircraft, it may be beneficial to use one or more RFMs instead of one or more AFMs to drive the input shaft 420. RFMs may be beneficial over AFMs, for example, where a wing having a relatively large chord length allows for a longer actuation assembly to be used. Moreover, using RFMs instead of AFMs may result in fewer overall components (and thus a less complicated arrangement) compared to a case in which AFMs are used, due to the greater longitudinal length of the RFMs compared to the AFMs.

In the second embodiment, the bevel gear 430 that is coaxial with the output shaft 440, and couples the output shaft 440 with the tip-rotating shaft 450, is not at the extreme end of the output shaft 440. Instead, RFMs 410 are arranged at both extreme ends of the output shaft 440, with the bevel gear 430 arranged therebetween. Such an arrangement may be beneficial where the spatial requirements of the system allow for the input shaft 420 (arranged along the line-of-flight direction) to be longer than the tip-rotating shaft 450, for example, or where it is desired for the coupling between the output shaft 440 and the tip-rotating shaft 450 to be upstream from the trailing edge of the wing.

In the second embodiment, the clutch 460 is arranged on the tip-rotating shaft 450. As such, the clutch 460 is arranged substantially in parallel with the hinge axis. By arranging the clutch 460 on the hinge line, the clutch 460 is closer to the wing tip device than a case in which the clutch 460 is arranged coaxially with the output shaft 440. This may be beneficial since, when the clutch 460 is dis-engaged, a greater proportion (i.e. a greater number of the components) of the actuator assembly 400 are protected from the torque generated by or acting upon the wing tip device. As such, a likelihood of damage due to excess torque exposure and/or back-driving may be reduced compared to a comparative case in which the clutch 460 is not arranged on, or at least aligned with, the tip-rotating shaft 450. Further, mounting the clutch 460 on the tip-rotating shaft 450 may be beneficial where space along the rotational axis of the output shaft 440 is limited or insufficient.

Figure 5:
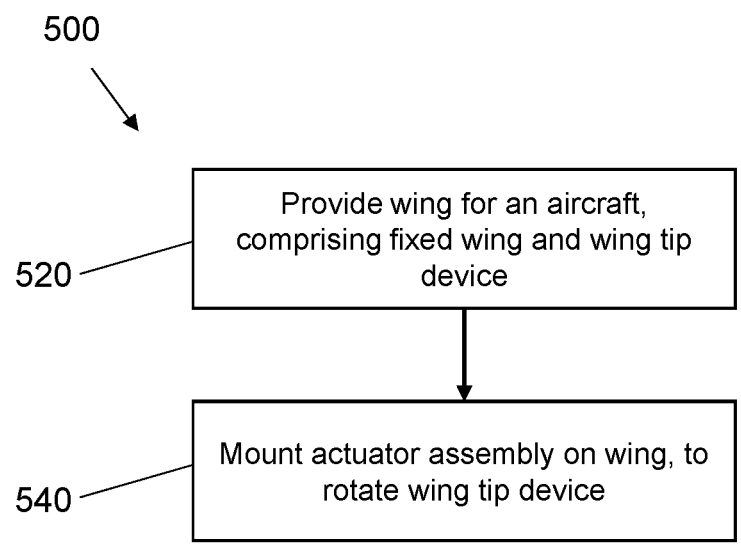
FIG. 5 shows a flow chart depicting a method according to a third embodiment.

FIG. 5 shows a method 500 according to an example. The method 500 may be considered a method of retro-fitting an actuator assembly to an existing aircraft. The method 500 may be used to retro-fit an actuator assembly such as the actuator assemblies 160, 400 described above to an existing aircraft.

At item 520, a wing for an aircraft is provided. The wing comprises a fixed wing. The wing further comprises a wing tip device mounted on a hinge, the hinge having a hinge axis, such that the wing tip device is rotatable, about the hinge axis, relative to the fixed wing.

At item 540, an actuator assembly is mounted on the wing. The actuator assembly is operable to rotate the wing tip device about the hinge axis. The actuator assembly comprises a tubular shaft and a motor. The motor is at least partially housed within the tubular shaft and is operable to cause rotation of the tubular shaft relative to the motor. The tubular shaft is orientated non-parallel to the hinge axis.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In examples described above, a plurality of motors are used to drive a common input shaft within the actuator assembly. In other examples, a plurality of input shafts may be independently driven. Each input shaft may be driven by one or more associated motors. The input shafts may be aligned with one another, e.g. via a flexible link. Such an arrangement may be beneficial in providing redundancy of motors and/or input shafts, and for ease of replacement and/or maintenance in the event of failure of one of the input shafts and/or motors. Further, dividing the input shaft into multiple components may allow for bending of the actuator assembly under loads, whilst maintaining a desired torque capacity, thereby increasing flexibility of the system. Each input shaft may be coupled to a common output shaft (via associated gearboxes). In some cases, multiple coaxial output shafts may be used, e.g. each being coupled to a different input shaft, or each being coupled to a common input shaft.

In some examples, the motor and gearbox of the actuator assembly are combined into a single line-replaceable unit (LRU). The output shaft may be arranged to house the LRU. Multiple such LRUs may be arranged coaxially in the actuator assembly. This may be beneficial in reducing the number of mountings to the aircraft wing (since there are fewer components compared to a case in which the motor and gearbox are separate). Further, by providing individual LRUs, tolerance to movement of the axis centreline (due to wing flexing) may be increased.

An actuator assembly such as the actuator assembly 160 described above may be used to drive moveable devices other than wing tip devices. Such devices may be on aircraft, other vehicles, or may be used in non-vehicle scenarios. For example, an actuator assembly such as that described herein may be used to drive leading edge slats or trailing edge flaps on an aircraft wing.

An actuator assembly such as the actuator assembly 160 described above may be configured to drive the motion of the wing tip device directly (e.g. via mechanical connection with the wing tip device and/or the hinge). In some examples, the actuator assembly is coupled with an aerodynamic lifting surface or other aerodynamic device to decrease the aerodynamic loading acting against the actuation of the folding wing tip device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. An aircraft comprising a wing, the wing having a fixed wing with a wing tip device, the wing tip device being rotatable, about a hinge axis, relative to the fixed wing, wherein the hinge axis is orientated non-parallel to a line-of-flight direction of the aircraft, and
wherein the aircraft comprises an actuator assembly operable to move the wing tip device relative to the fixed wing, the actuator assembly comprising:
a primary shaft having an axis of rotation orientated parallel to the line-of-flight direction,
a motor operable to cause rotation of the primary shaft, and
a secondary shaft orientated parallel to the hinge axis and couplable to the primary shaft, the secondary shaft arranged to rotate the wing tip device about the hinge axis in response to the rotation of the primary shaft.

2. An aircraft according to claim 1,
wherein the primary shaft is tubular, and
wherein the motor is at least partially enclosed by the primary shaft and configured to cause rotation of the primary shaft relative to the motor.

3. An aircraft according to claim 1,
wherein the primary shaft comprises an opening, and
wherein the actuator assembly comprises fixing means extending between the motor and the wing, through the opening of the primary shaft, to fix the motor to the wing.

4. An aircraft according to claim 3,
wherein the opening comprises a slot extending around a part of the circumference of the primary shaft in an azimuthal direction, and
wherein the fixing means extends through the slot, such that the motor remains fixed to the wing via the fixing means during the rotation of the primary shaft.

5. An aircraft according to claim 1, wherein the motor comprises an axial flux motor.

6. An aircraft according to claim 1, wherein the actuator assembly comprises a plurality of motors arranged to complementarily cause rotation of the primary shaft.

7. An aircraft according to claim 1, wherein the hinge axis is orientated perpendicular to the swept mean chord axis of the wing.

8. An aircraft according to claim 1, wherein the secondary shaft is coaxial with the hinge axis.

9. An aircraft according to claim 1, wherein the actuator assembly comprises:
an input shaft co-aligned with the primary shaft; and
a gearbox coupling the input shaft with the primary shaft, wherein the motor is operable to drive the input shaft thereby to cause rotation of the primary shaft.

10. An aircraft according to claim 9,
wherein the primary shaft is tubular, and
wherein the gearbox is at least partially enclosed by the primary shaft, the primary shaft being configured to rotate relative to the gearbox.

11. An aircraft according to claim 1, wherein the actuator assembly comprises a clutch for selectively disengaging the wing tip device from the motor.

12. An aircraft according to claim 11,
wherein the clutch is arranged to selectively decouple the secondary shaft from the primary shaft, and
wherein the clutch is arranged on the secondary shaft.

13. An aircraft according to claim 1, wherein the actuator assembly comprises a bevel gear for coupling the primary shaft and the secondary shaft.

14. An aircraft according to claim 1, wherein the aircraft comprises an aerodynamic fairing arranged to enclose at least part of the actuator assembly.

15. An aircraft according to claim 1, wherein the wing tip device is rotatable, about the hinge axis, between:
   i) a flight configuration for use during flight, in which configuration upper and lower surfaces of the wing tip device are continuations of upper and lower surfaces of the fixed wing; and
   (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced, and wherein the actuator assembly is operable to move the wing tip device from the load alleviating configuration to the flight configuration.

16. An aircraft according to claim 15, wherein the aircraft comprises a restraining assembly operable between a restraining mode in which the wing tip device is held in the flight configuration using a restraining force, and a releasing mode in which the restraining force on the wing tip device is released, such that the wing tip device is able to adopt the load alleviating configuration.

17. An aircraft wing for use as the wing according to claim 1, the wing comprising a fixed wing with a wing tip device, the wing tip device being rotatable, about a hinge axis, relative to the fixed wing,
   wherein the hinge axis is orientated non-parallel to a line-of-flight direction, and
   wherein the wing comprises an actuator assembly operable to move the wing tip device relative to the fixed wing, the actuator assembly comprising:
      a primary shaft having an axis of rotation orientated parallel to the line-of flight direction,
      a motor operable to cause rotation of the primary shaft, and
      a secondary shaft orientated parallel to the hinge axis and couplable to the primary shaft, the secondary shaft arranged to rotate the wing tip device about the hinge axis in response to the rotation of the primary shaft.

18. A method comprising:
   providing a wing for an aircraft, the wing comprising:
      a fixed wing; and
      a wing tip device mounted on a hinge, the hinge having a hinge axis, such that the wing tip device is rotatable, about the hinge axis, relative to the fixed wing; and
   mounting an actuator assembly on the wing, the actuator assembly being operable to rotate the wing tip device about the hinge axis, the actuator assembly comprising:
      a tubular shaft; and
      a motor, at least partially housed within the tubular shaft and operable to cause rotation of the tubular shaft relative to the motor, wherein the tubular shaft is orientated non-parallel to the hinge axis.

19. An aircraft comprising a wing, the wing having a fixed wing with a wing tip device, the wing tip device rotatably mounted about a hinge axis, such that the wing tip device may rotate, about the hinge axis, relative to the fixed wing,
   wherein the aircraft comprises an actuator assembly operable to rotate the wing tip device about the hinge axis, the actuator assembly comprising:
      a tubular shaft having an axis of rotation orientated non-parallel to the hinge axis,
      a motor, at least partially housed within the tubular shaft and operable to cause rotation of the tubular shaft, and
      a tip-rotating shaft arranged along the hinge axis and coupled to the tubular shaft, thereby to rotate the wing tip device about the hinge axis in response to the rotation of the tubular shaft.

20. An aircraft comprising a wing, the wing having a fixed wing with a wing tip device, the wing tip device being rotatable, about a hinge axis, relative to the fixed wing,
   wherein the hinge axis is orientated non-parallel to a line-of-flight direction of the aircraft, and
   wherein the aircraft comprises an actuator assembly operable to move the wing tip device relative to the fixed wing, the actuator assembly comprising:
      a primary shaft having an axis of rotation aligned with the line-of-flight direction,
      a motor operable to cause rotation of the primary shaft, and
      a secondary shaft aligned with the hinge axis and couplable to the primary shaft, the secondary shaft arranged to rotate the wing tip device about the hinge axis in response to the rotation of the primary shaft.

21. An aircraft comprising a wing, the wing having a fixed wing with a wing tip device, the wing tip device being rotatable, about a hinge axis, relative to the fixed wing,
   wherein the hinge axis is orientated non-parallel to a line-of-flight direction of the aircraft, and
   wherein the aircraft comprises an actuator assembly operable to move the wing tip device relative to the fixed wing, the actuator assembly comprising:
      a primary shaft having an axis of rotation orientated non-parallel to the hinge axis,
      a motor operable to cause rotation of the primary shaft, and
      a secondary shaft aligned with the hinge axis and couplable to the primary shaft, the secondary shaft arranged to rotate the wing tip device about the hinge axis in response to the rotation of the primary shaft.

22. An aircraft according to claim 21,
   wherein the primary shaft is tubular, and
   wherein the motor is at least partially enclosed by the primary shaft and configured to cause rotation of the primary shaft relative to the motor.

* * * * *